(12) United States Patent
Higashiyama et al.

(10) Patent No.: US 10,971,116 B2
(45) Date of Patent: Apr. 6, 2021

(54) DISPLAY DEVICE, CONTROL METHOD FOR PLACEMENT OF A VIRTUAL IMAGE ON A PROJECTION SURFACE OF A VEHICLE, AND STORAGE MEDIUM

(71) Applicant: HONDA MOTOR CO., LTD., Tokyo (JP)

(72) Inventors: Masafumi Higashiyama, Wako (JP); Takuya Kimura, Wako (JP); Shinji Kawakami, Wako (JP); Tatsuya Iwasa, Wako (JP); Yuji Kuwashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/559,817

(22) Filed: Sep. 4, 2019

(65) Prior Publication Data
US 2020/0105231 A1 Apr. 2, 2020

(30) Foreign Application Priority Data
Sep. 27, 2018 (JP) .............. JP2018-182013

(51) Int. Cl.
*G09G 5/38* (2006.01)
*G02B 27/01* (2006.01)
(Continued)

(52) U.S. Cl.
CPC ............. *G09G 5/38* (2013.01); *B60K 35/00* (2013.01); *G02B 27/0101* (2013.01);
(Continued)

(58) Field of Classification Search
None
See application file for complete search history.

(56) References Cited

U.S. PATENT DOCUMENTS

| 2011/0134498 A1* | 6/2011 | Ohta | G02B 27/01 359/200.7 |
|---|---|---|---|
| 2015/0226964 A1* | 8/2015 | Sasaki | G02B 27/01 359/631 |

(Continued)

FOREIGN PATENT DOCUMENTS

| JP | 2003-039982 | 2/2003 |
|---|---|---|
| JP | 2015-080988 | 4/2015 |
| JP | 2017-091115 | 5/2017 |

OTHER PUBLICATIONS

Japanese Office Action for Japanese Patent Application No. 2018-182013 dated Aug. 4, 2020.
(Continued)

*Primary Examiner* — Patrick F Valdez
(74) *Attorney, Agent, or Firm* — Amin, Turocy & Watson, LLP

(57) ABSTRACT

A display device includes a light projection device which projects light including an image, an optical mechanism which is capable of adjusting a distance from a predetermined position to a position where the light is formed as a virtual image, a concave mirror which reflects light toward a reflector, a concave mirror actuator which adjusts a reflection angle of the concave mirror, and a control device which controls the light projection device and the concave mirror actuator, in which the control device adjusts a projection position on a projection surface of the light projected from the light projection device having an angle formed by a horizontal surface passing through a predetermined position on an image and a segment from the predetermined position to a position where the light is formed as a virtual image so as to curb fluctuation occurring due to movement of a vehicle.

5 Claims, 12 Drawing Sheets

(51) Int. Cl.
  B60K 35/00      (2006.01)
  G06F 3/02       (2006.01)
  *G06F 3/0484*       (2013.01)

(52) U.S. Cl.
  CPC ..... *G02B 27/0149* (2013.01); *G02B 27/0179*
            (2013.01); *G06F 3/02* (2013.01); *B60K*
              *2370/1529* (2019.05); *B60K 2370/23*
          (2019.05); *B60K 2370/31* (2019.05); *B60K*
              *2370/334* (2019.05); *G02B 2027/0159*
           (2013.01); *G06F 3/0484* (2013.01); *G09G*
                *2340/0464* (2013.01); *G09G 2354/00*
                 (2013.01); *G09G 2380/10* (2013.01)

(56) References Cited

U.S. PATENT DOCUMENTS

| | | | | |
|---|---|---|---|---|
| 2018/0015876 A1* | 1/2018 | Yamagata | .......... | G02B 27/0149 |
| 2019/0086662 A1* | 3/2019 | Matsuzaki | ......... | G02B 27/0149 |
| 2019/0129172 A1* | 5/2019 | Misawa | ............ | G02B 27/0101 |
| 2019/0139286 A1* | 5/2019 | Shimoda | ............ | G02B 27/0101 |
| 2019/0391400 A1* | 12/2019 | Funabiki | ............ | G02B 27/0101 |

OTHER PUBLICATIONS

Japanese Notice of Allowance for Japanese Patent Application No. 2018-182013 dated Nov. 4, 2020.

\* cited by examiner

US 10,971,116 B2

DISPLAY DEVICE, CONTROL METHOD FOR PLACEMENT OF A VIRTUAL IMAGE ON A PROJECTION SURFACE OF A VEHICLE, AND STORAGE MEDIUM

CROSS-REFERENCE TO RELATED APPLICATION

Priority is claimed on Japanese Patent Application No. 2018-182013, filed Sep. 27, 2018, the content of which is incorporated herein by reference.

BACKGROUND

Field of the Invention

The present invention relates to a display device, a display control method, and a storage medium.

Description of Related Art

In the related art, head-up display devices (hereinafter, referred to as head-up display (HUD) devices) that display images related to information for drivers on front windshields have become known (for example, Japanese Unexamined Patent Application, First Publication No. 2017-91115). Various marks indicating obstacles, alerts, and moving directions are displayed at predetermined positions on front windshields so as to be superimposed on scenes in front of vehicles by using such HUD devices, so that drivers can understand the displayed various information while keeping sight line directions ahead during driving.

SUMMARY

However, in HUD devices of the related art, a display position of an image changes due to the movement of a vehicle, and thus the visibility of the displayed image may be lowered.

Aspects of the present invention are contrived in view of such circumstances, and an object thereof is to provide a display device, a display control method, and a storage medium which are capable of improving visibility.

A display device, a display control method, and a storage medium according to the present invention adopt the following configurations.

(1) A display device according to an aspect of the invention includes a light projection device which has a two-dimensional projection surface and projects light including an image, an optical mechanism which is provided on a path of the light and is capable of adjusting a distance from a predetermined position to a position where the light is formed as a virtual image, a concave mirror which reflects light having passed through the optical mechanism toward a reflector, a concave mirror actuator which adjusts a reflection angle of the concave mirror, and a control device which controls the light projection device and the concave mirror actuator, in which the control device adjusts a projection position on the projection surface of the light projected from the light projection device having an angle formed by a horizontal surface passing through a predetermined position on an image formed by the concave mirror and a segment from the predetermined position to a position where the light is formed as a virtual image so as to curb fluctuation occurring due to movement of a vehicle.

(2) In the aspect of (1), the display device may further include an operator which receives an adjustment operation for the angle formed by the horizontal surface and the segment from an occupant of the vehicle, in which the control device may adjust the angle by driving the concave mirror actuator on the basis of the adjustment operation in a case where the adjustment operation for the angle is received by the operator, and may adjust the projection position on the projection surface of the light projected from the light projection device in a case where fluctuation in the angle occurring due to movement of the vehicle is curbed.

(3) In the aspect of (2), the control device may receive the adjustment operation for the angle of the operator and may further adjust the projection position on the projection surface of the light projected from the light projection device in a case where driving of the concave mirror due to the driving of the concave mirror actuator based on the received adjustment operation has reached a limit, thereby adjusting the angle formed by the horizontal surface and the segment.

(4) In the aspect of (3), the display device may further include a notification controller which notifies the occupant of the vehicle of information using a notifier, in which the notification controller may inquire of the occupant using the notifier whether to adjust the projection position on the projection surface of the light projected from the light projection device in a case where the driving of the concave mirror due to the driving of the concave mirror actuator has reached a limit.

(5) In the aspect of (1), the control device may adjust the projection position on the projection surface of the light projected from the light projection device and then may adjust the reflection angle of the concave mirror due to the driving of the concave mirror actuator, thereby adjusting the angle formed by the horizontal surface and the segment.

(6) A display control method according to another aspect of the invention includes causing a display device to adjust a projection position on a projection surface of light projected from a light projection device having an angle formed by a horizontal surface passing through a predetermined position on an image formed by a concave mirror and a segment from the predetermined position to a position where the light is formed as a virtual image so as to curb fluctuation occurring due to movement of a vehicle, the display device including the light projection device which has a two-dimensional projection surface and projects light including an image, an optical mechanism which is provided on a path of the light and is capable of adjusting a distance from the predetermined position to the position where the light is formed as a virtual image, the concave mirror which reflects light having passed through the optical mechanism toward a reflector, a concave mirror actuator which adjusts a reflection angle of the concave mirror, and a control device which controls the light projection device and the concave mirror actuator.

(7) A computer readable non-transitory storage medium according to still another aspect of the invention stores a program for causing a display device to adjust a projection position on a projection surface of light projected from a light projection device having an angle formed by a horizontal surface passing through a predetermined position on an image formed by a concave mirror and a segment from the predetermined position to a position where the light is formed as a virtual image so as to curb fluctuation occurring due to movement of a vehicle, the display device including the light projection device which has a two-dimensional projection surface and projects light including an image, an optical mechanism which is provided on a path of the light and is capable of adjusting a distance from the predetermined position to the position where the light is formed as a virtual image, the concave mirror which reflects light having passed through the optical mechanism toward a reflector, a concave mirror actuator which adjusts a reflection angle of the concave mirror, and a control device which controls the light projection device and the concave mirror actuator.

According to the aspects of (1) to (7), it is possible to improve visibility.

DESCRIPTION OF EMBODIMENTS

Hereinafter, embodiments of a display device, a display control method, and a storage medium of the present invention will be described with reference to the accompanying drawings. The display device of the embodiment is a device which is mounted on, for example, a vehicle (hereinafter, referred to as a vehicle M) and makes an image visually recognizable by superimposing the image on a scene. The display device can be referred to as an HUD device. As an example, the display device is a device that makes an observer visually recognize a virtual image by projecting light including an image onto a front windshield of the vehicle M. The observer is, for example, a driver, but may be an occupant other than the driver. The display device may be a device that projects light onto a transparent member (a visor, a spectacle lens, or the like) included in a device worn on a human body, or may be a device to which a light transmissive display device is attached. In the following description, it is assumed that a display device is a device which is mounted on the vehicle M and projects light including an image onto a front windshield.

In the following description, a positional relationship and the like will be appropriately described using an XYZ coordinate system.

In the following description, a "virtual image" may be referred to as an "image".

First Embodiment

[Overall Configuration]

Figure 1:
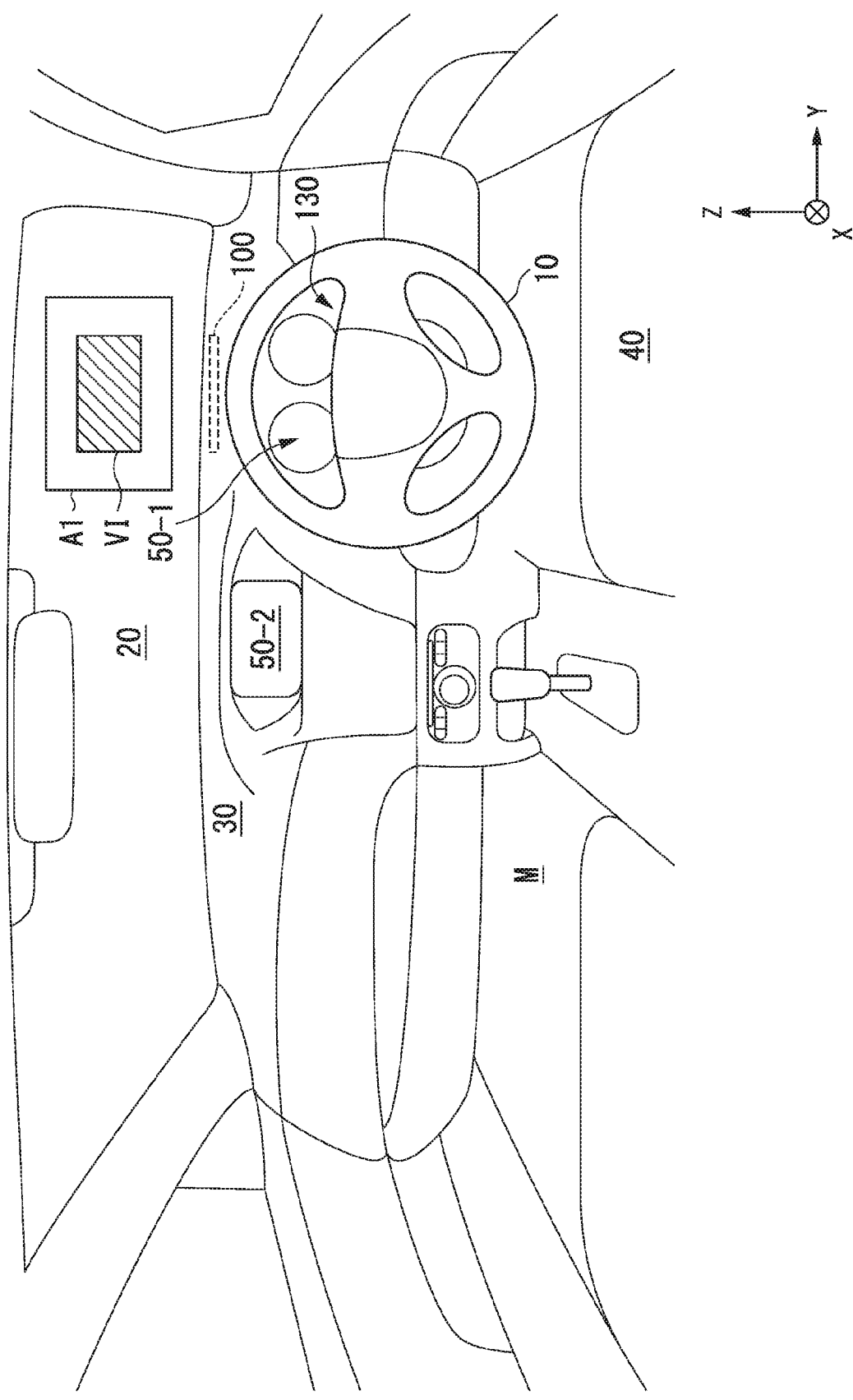
FIG. 1 is a diagram showing a configuration of the inside of a vehicle M equipped with a display device according to a first embodiment.

FIG. 1 is a diagram showing a configuration of the inside of the vehicle M on which a display device 100 according to a first embodiment is mounted. The vehicle M is provided with, for example, a steering wheel 10 that controls the steering of the vehicle M, a front windshield (an example of a reflector) 20 that divides the vehicle into the outside and the inside, and an instrument panel 30. The front windshield 20 is a member having light transmittance. For example, the display device 100 makes a driver seating on a driver's seat 40 visually recognize a virtual image VI by projecting light including an image onto a displayable region A1 provided at a portion of the front windshield 20 in front of the driver's seat.

For example, the display device 100 makes the driver visually recognize an image obtained by imaging information for supporting the driver's driving as the virtual image VI. The information for supporting the driver's driving includes information such as the speed of the vehicle M, a driving force distribution ratio, an engine speed, operation states of driving support functions, shift positions, sign recognition results, and intersection positions. The driving support functions include, for example, a direction instruction function for guiding the vehicle M to a preset destination, an adaptive cruise control (ACC), a lane keep assist system (LKAS), a collision mitigation brake system (CMBS), a traffic jam assist function, and the like. The driving support functions may include, for example, a telephone function for controlling incoming and outgoing calls of a telephone mounted on the vehicle M.

The vehicle M may be provided with a first display 50-1 and a second display 50-2 in addition to the display device 100. The first display 50-1 is a display device provided, for example, in the vicinity of the front of the driver's seat 40 in the instrument panel 30 and visually recognizable by the driver through a gap of the steering wheel 10 or over the steering wheel 10. The first display 50-1 displays, for example, information for supporting the driver's driving. The second display 50-2 is attached to, for example, the central portion of the instrument panel 30. The second display 50-2 displays, for example, an image corresponding to a navigation process executed by a navigation device (not shown) mounted on the vehicle M, a video of a counterpart in a video phone, and the like. The second display 50-2 may display a television program, reproduce a DVD, or display contents such as a downloaded movie. The first display 50-1 and the second display 50-2 may receive an operation from an occupant as touch panel devices. Details of the received operation are output to the display device 100 or another in-vehicle device.

The vehicle M is provided with an operation switch (an example of an operator) 130 that receives an instruction for switching turn-on/turn-off of display performed by the display device 100 and an instruction for adjusting the position of the virtual image VI. The operation switch 130 is attached to, for example, a position where the driver seating on the driver's seat 40 can operate the operation switch without changing his or her posture much. For example, the operation switch 130 may be provided in front of the first display 50-1, may be provided in a boss portion of the steering wheel 10, or may be provided at a spoke connecting the steering wheel 10 and the instrument panel 30 to each other.

Figure 2:
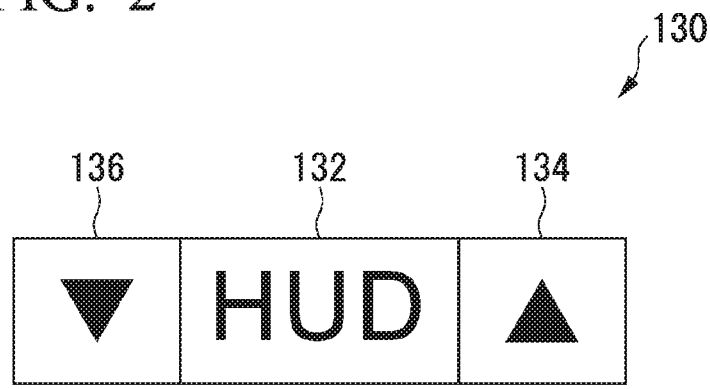
FIG. 2 is a diagram showing an operation switch according to the first embodiment.

FIG. 2 is a diagram showing the operation switch 130 of the first embodiment. The operation switch 130 includes, for example, a main switch 132 and adjustment switches 134 and 136. The main switch 132 is a switch for switching turn-on/turn-off of the display device 100.

For example, the adjustment switch 134 is a switch for receiving an instruction (adjustment operation) for moving the position of the virtual image VI visually recognized so as to be in a space passing through a displayable range A1 from a sight line position P1 of the driver to the upper side (hereinafter, referred to as upward) with respect to a vertical direction Z. The driver can continuously move a visual recognition position of the virtual image VI upward within the displayable range A1 by continuously pressing the adjustment switch 134.

The adjustment switch 136 is a switch for receiving an instruction (adjustment operation) for moving the above-described position of the virtual image VI to the lower side (hereinafter, referred to as downward) with respect to the vertical direction Z. The driver can continuously move a visual recognition position of the virtual image VI downward within the displayable range A1 by continuously pressing the adjustment switch 136.

The adjustment switch 134 may be a switch for increasing a luminance of the visually recognized virtual image VI, instead of (to in addition to) moving the position of the virtual image VI upward. The adjustment switch 136 may be a switch for decreasing a luminance of the visually recognized virtual image VI, instead of (to in addition to) moving the position of the virtual image VI downward. Details of the instructions received by the adjustment switches 134 and 136 may be switched on the basis of any operation.

For example, any operation is a long-pressing operation for the main switch 132. The operation switch 130 may include a switch for selecting display details and a switch for adjusting a luminance of a virtual image displayed exclusively, in addition to the switches shown in FIG. 2.

Figure 3:
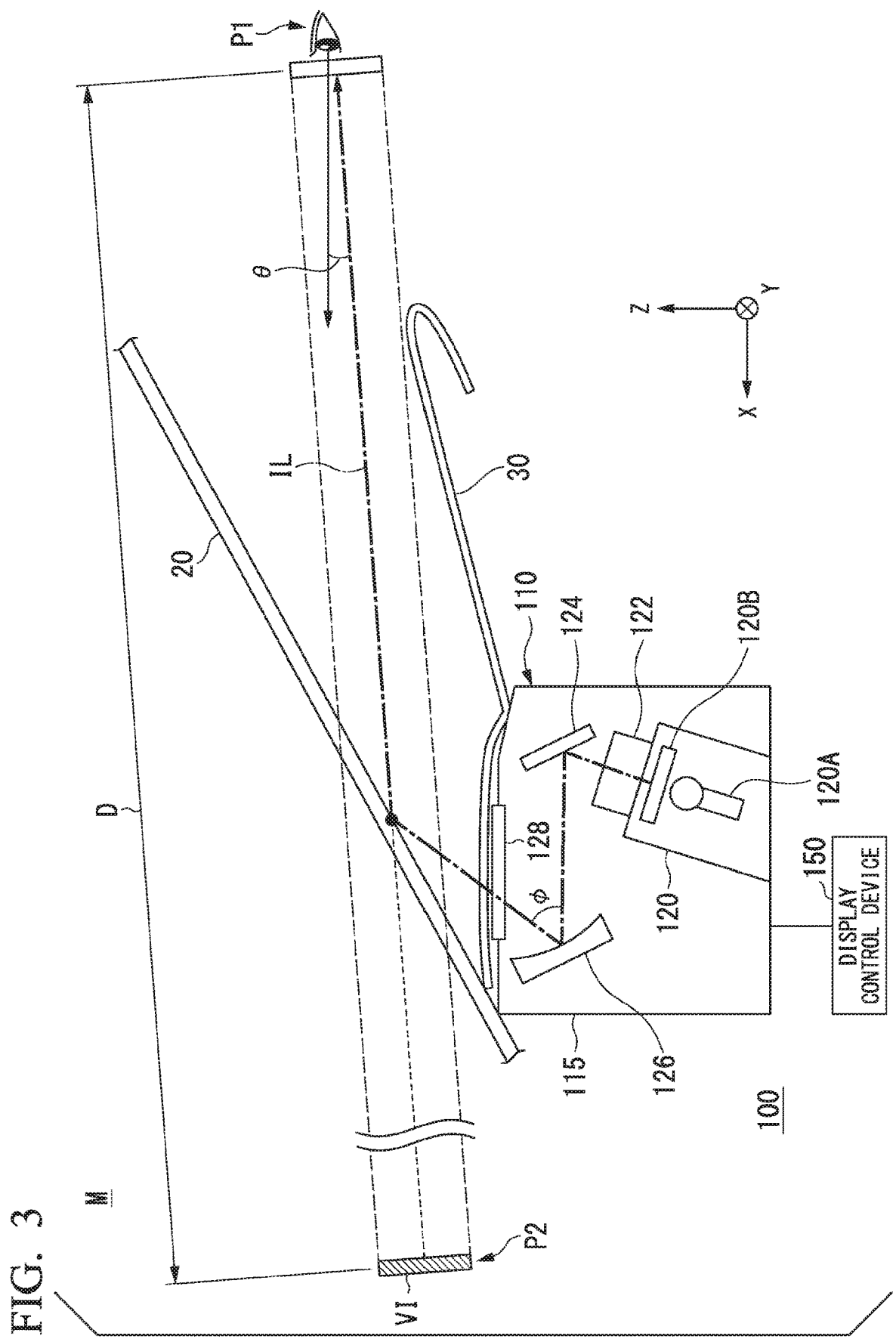
FIG. 3 is a partial configuration diagram of the display device.

FIG. 3 is a partial configuration diagram of the display device 100. The display device 100 includes, for example, a display 110 and a display control device 150. A combination of the display control device 150, an optical system controller 170 to be described later, and a display controller 172 to be described later is an example of a "control device". The display 110 accommodates, for example, a light projection device 120, an optical mechanism 122, a plane mirror 124, a concave mirror 126, and a light transmitting cover 128 in a housing 115. In addition to these, the display device 100 includes various sensors and actuators, which will be described later. The display may be configured not to include the optical mechanism 122.

The light projection device 120 has a two-dimensional projection surface and projects light including an image. The light projection device 120 includes, for example, a light source 120A and a display element 120B. The light source 120A is, for example, a cold-cathode tube and outputs visible light corresponding to the virtual image VI to be visually recognized by the driver. The display element 120B controls the transmission of visible light from the light source 120A. The display element 120B is, for example, a thin film transistor (TFT) type liquid crystal display device (LCD) having a two-dimensional projection surface.

The display element 120B controls each of a plurality of pixels to control the degree of transmission for each color element of visible light from the light source 120A, thereby including an image element in the virtual image VI and determining the form (appearance) of the virtual image VI. Hereinafter, visible light passing through the display element 120B and including an image will be referred to as image light IL. The display element 120B may be an organic electro-luminescence (EL) display, and in this case, the light source 120A may be omitted.

The optical mechanism 122 includes, for example, one or more lenses. For example, the position of each lens can be adjusted in an optical axis direction. For example, the optical mechanism 122, which is provided on a path of the image light IL output by the light projection device 120, transmits the image light IL incident from the light projection device 120 and emits the image light IL toward the front windshield 20. For example, the optical mechanism 122 can adjust a distance (hereinafter, referred to as a virtual image visible distance D) from the sight line position P1 (an example of a predetermined position) of the driver to a formation position P2 where the image light IL is formed as a virtual image by changing the position of the lens. The sight line position P1 of the driver is a position where the image light IL reflected by the concave mirror 126 and the front windshield 20 is condensed, and is a position where it is assumed that the driver's eyes are present. The virtual image visible distance D is strictly a distance of a segment having an inclination in a vertical direction. However, when an expression of "the virtual image visible distance D is 7 [m]" or the like is given in the following description, the distance may mean a distance in a horizontal direction.

In the following description, a depression angle $\theta$ will be defined as an angle formed by a horizontal surface passing through the sight line position P1 of the driver and a segment from the sight line position P1 of the driver to the formation position P2. As the position of the virtual image VI to be formed becomes lower, that is, as a sight line direction in which the driver views the virtual image VI becomes lower, the depression angle $\theta$ increases. The depression angle $\theta$ is determined on the basis of a reflection angle $\varphi$ of the concave mirror 126 and a display position of the original image in the display element 120B. The reflection angle $\varphi$ is an angle formed by an incidence direction in which the image light IL reflected by the plane mirror 124 is incident on the concave mirror 126 and an emission direction in which the concave mirror 126 emits the image light IL.

The plane mirror 124 reflects visible light (that is, the image light IL) emitted by the light source 120A and having passed through the display element 120B in the direction of the concave mirror 126.

The concave mirror 126 reflects the image light IL incident from the plane mirror 124 and emits the image light IL toward the front windshield 20. The concave mirror 126 is supported to be rotatable (revolvable) around the Y-axis which is an axis in a width direction of the vehicle M.

The light transmitting cover 128 transmits the image light IL from the concave mirror 126 to make the image light to reach the front windshield 20, and curbs the inflow of foreign substances such as dust, dirt, and water drops in the housing 115. The light transmitting cover 128 is provided at an opening formed in an upper member of the housing 115. The instrument panel 30 is also provided with an opening or a light transmittance member, and the image light IL passes through the light transmitting cover 128 and the opening or the light transmittance member of the instrument panel 30 and reaches the front windshield 20.

The image light IL incident on the front windshield 20 is reflected by the front windshield 20 and is condensed on the sight line position P1 of the driver. In this case, when the driver's eyes are positioned at the sight line position P1 of the driver, the driver feels as if an image projected by the image light IL is displayed in front of the vehicle M.

Figure 4:
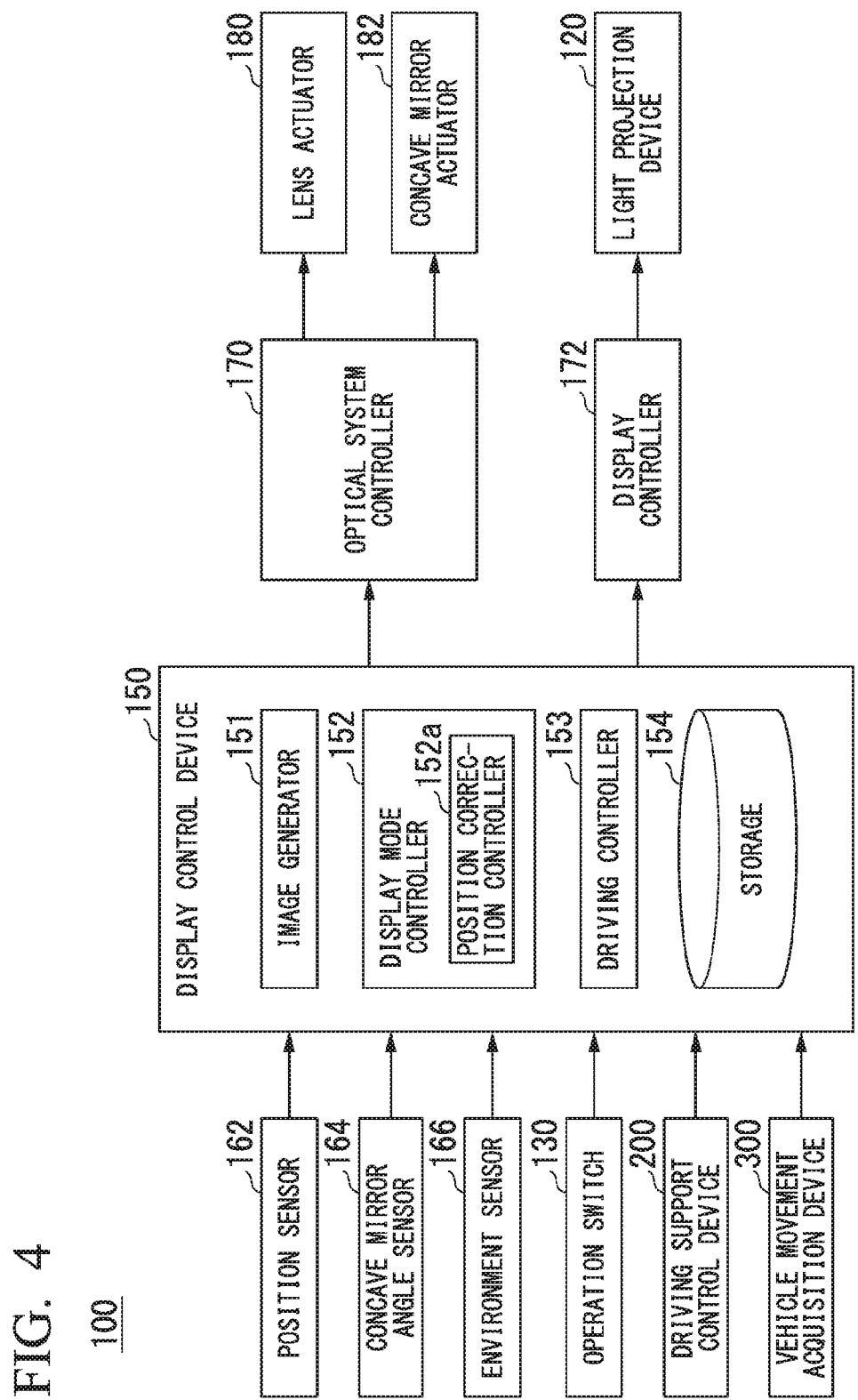
FIG. 4 is a diagram showing a configuration example of the display device centering on a display control device.

The display control device 150 controls the display of the virtual image VI visually recognized by the driver. FIG. 4 is a diagram showing a configuration example of the display device 100 centering on the display control device 150. In the example shown in FIG. 4, a position sensor 162, a concave mirror angle sensor 164, an environment sensor 166, an operation switch 130, an optical system controller 170, a display controller 172, a lens actuator (an example of an optical mechanism actuator) 180, a concave mirror actuator 182, a light projection device 120, a driving support control device 200, and a vehicle movement acquisition device 300 which are included in the display device 100 are shown, in addition to the display control device 150.

The position sensor 162 detects the positions of one or more lenses included in the optical mechanism 122. The position sensor 162 may detect the position of the display element 120B. The concave mirror angle sensor 164 detects a rotation angle around the Y-axis of the concave mirror 126.

The environment sensor 166 includes, for example, a temperature sensor that detects temperatures of the light projection device 120 and the optical mechanism 122, and an illuminance sensor that detects an illuminance in the vicinity of the vehicle M. The environment sensor 166 may include a vehicle speed sensor that detects the speed of the vehicle M, an acceleration sensor that detects an acceleration, a yaw rate sensor that detects an angular velocity around a vertical axis, a direction sensor that detects the direction of the vehicle M, and a pitch angle sensor that detects a pitch angle around the Y-axis of the vehicle M. The environment sensor 166 may include a height sensor (vehicle height sensor) that detects the height of the vehicle M and an inclination of a vehicle body. The height sensor is installed at, for example, front, rear, left, and right wheels of the vehicle M. An object (for example, an obstacle such as another vehicle or a pedestrian) which is present in the vicinity of the vehicle M may be detected by the environment sensor 166, a camera, a radar device, a finder (for example, light detection and ranging (LIDAR)), or the like. The environment sensor 166 may include sensors that detect that a brake system and an engine system of the vehicle need to be checked, headlights are set to high beam, a door is not locked, a door is not completely closed, a fog lamp is turned on, an incoming call is received in a telephone function installed in the vehicle M, the vehicle has approached a timing at which the vehicle is turning right and left to go to a destination set in the navigation device, and the like.

The optical system controller 170 drives the lens actuator 180 on the basis of a control signal output by a driving controller 153 to adjust the virtual image visible distance D. The optical system controller 170 drives the concave mirror actuator 182 on the basis of a control signal output by the driving controller 153 to adjust a rotation angle of the concave mirror.

The display controller 172 controls the light projection device 120 so that an image generated by an image generator 151 and based on a display mode determined by a display mode controller 152 is output. For example, the image includes an image related to information for supporting the driver's driving which is regularly displayed (hereinafter, referred to as a first image) and an image displayed at the time of urgency or the occurrence of a predetermined event such as a predetermined function (hereinafter, referred to as a second image). For example, the predetermined event is an event that occurs depending on the state of the vehicle M. The event includes events corresponding to various functions by the driving support control device 200 and events occurring on the basis of information detected by the environment sensor 166 (a check instruction, and a warning). The second image is, for example, an image related to a lane deviation warning, an image for notifying that the vehicle M is approaching a preceding vehicle, an image indicating that a collision reduction brake has operated, and other warning images. The second image may be displayed while being interrupted by the first image, or may be displayed together with the first image.

The display controller 172 adjusts a projection position on a projection surface of light projected from the light projection device 120 on the basis of a control signal output by the display mode controller 152. Since the adjustment of a projection position on the projection surface is performed under the control of software, the adjustment is faster than driving control by hardware that drives a motor and the like. Thereby, the depression angle θ can be adjusted more rapidly than when the depression angle θ is adjusted by driving the concave mirror actuator 182 to change the reflection angle φ of the concave mirror 126.

The lens actuator 180 acquires a driving signal from the optical system controller 170 and drives a motor and the like on the basis of the acquired driving signal to move the position of one or more lenses included in the optical mechanism 122. The lens actuator 180 may physically move the position of the display element 120B along the image light IL. Thereby, the virtual image visible distance D is adjusted.

The concave mirror actuator 182 acquires a driving signal from the optical system controller 170 and drives a motor and the like on the basis of the acquired driving signal to rotate the concave mirror actuator 182 around the Y-axis and adjust the reflection angle φ of the concave mirror 126. Thereby, the depression angle θ is adjusted.

In the first embodiment, how the virtual image IV visually recognized by the driver is viewed is determined in accordance with a transmission mode (for example, a display position of an original image in the display element 120B) of visible light in the light projection device 120 and a rotation angle of the concave mirror 126. For example, when at least one of a transmission mode of visible light in the light projection device 120 and a rotation angle of the concave mirror 126 is changed, the depression angle θ of the virtual image VI changes.

The driving support control device 200 executes a driving support function of supporting a driving operation by the driver of the vehicle M. In a case where the driving support function is executed, for example, the vehicle M performs either one or both of steering control or speed control independently of the driver's operation of a driving operator (for example, the steering wheel 10, an accelerator pedal, and a brake pedal). The driving support control device 200 performs acceleration control (speed control) based on a distance between the vehicle M and a preceding vehicle so that the vehicle travels while keeping a constant distance therebetween on the basis of information which is input through the environment sensor 166 or an object recognition device (not shown) mounted on the vehicle M, for example, when ACC is executed as a driving support function. The driving support control device 200 performs steering control so that the vehicle M travels while keeping a traveling lane on which the vehicle is traveling at present (lane keeping) when LKAS is executed as a driving support function. The driving support control device 200 performs deceleration control or stop control of the vehicle M in a case where a distance between the vehicle M and a preceding vehicle is less than a predetermined distance when CMBS is executed as a driving support function. For example, the driving support control device 200 outputs the state of a driving support function to the display control device 150. The driving support control device 200 outputs information for giving a warning (warning information) to the driver before executing LKAS or CMBS to the display control device 150. The warning information is, for example, a lane deviation warning, a preceding vehicle approach warning, or the like. In a case where the above-described various functions are executed by the driving support control device 200, events corresponding to the various functions occur.

The vehicle movement acquisition device 300 acquires movement of the vehicle M during traveling. The movement of the vehicle M includes, for example, information regarding the speed and steering of the vehicle M through the operation of the driver's driving operator and information such as an inclination, a vehicle height, and posture of the vehicle M which are detected by the environment sensor 166 and the like.

[Display Control Device]

Next, the display control device 150 will be described. The display control device 150 includes, for example, the image generator 151, the display mode controller 152, the driving controller 153, and a storage 154. The components other than the storage 154 are realized by causing a hardware processor such as a central processing unit (CPU) to execute a program (software). Some or all of these components may be realized by hardware (a circuit unit; circuitry is included) such as a large scale integration (LSI), an application specific integrated circuit (ASIC), a field-programmable gate array (FPGA), or a graphics processing unit (GPU) or may be realized by cooperation of software and hardware. The program may be stored in advance in the storage 154, such as an HDD or a flash memory, of the display control device 150, may be stored in a detachable storage medium (a non-transitory storage medium) such as a DVD or a CD-ROM, or may be installed in the storage 154 of the display control device 150 by a storage medium being mounted on a drive device.

For example, the display control device 150 can execute functions of the image generator 151, the display mode controller 152, and the driving controller 153 in a case where a signal for setting an on state is received using the operation switch 130 (main switch 132), and stops the above-described functions in a case where a signal for setting an off state is received.

In a case where the display device 100 is in an on state, the image generator 151 generates a first image which is visually recognized by the driver by being superimposed on a scene. In a case where a condition that an image to be superimposed on a scene is interrupted by a second image is satisfied, the image generator 151 generates the second image instead of (or in addition to) the first image. The output of the first image and the second image to be displayed may be set by the driver using the operation switch 130, another operator, a graphical user interface (GUI) switch displayed on the second display 50-2, or the like. Setting information which is set by the driver is stored in, for example, the storage 154 or the like. For example, when warning information is output by the driving support control device 200, and the image generator 151 generates an image element based on the occurrence of an event in which warning information is output. The image element includes, for example, an icon, a mark, a road sign, and the like for identifying contents and details of the contents.

The display mode controller 152 sets a display mode of an image generated by the image generator 151 and generates control information for displaying an image in the set display mode. The display mode is whether or not there is an image (a first image, a second image) which is visually recognized by the driver by being superimposed on a scene is displayed, the position (depression angle θ), size, and luminance of the image in a case where the image is displayed, a control amount of adjustment depending on a display position in a virtual image visible distance D, or the like. The display mode controller 152 changes a display mode on the basis of a lens position detected by the position sensor 162 and a rotation angle of the concave mirror 126 detected by the concave mirror angle sensor 164. The display mode controller 152 may change a display mode on the basis of information detected by the environment sensor 166 and details of a driving support function provided by the driving support control device 200. The display mode controller 152 outputs the generated control information to the display controller 172 and the driving controller 153.

The display mode controller 152 includes, for example, a position correction controller 152a. The position correction controller 152a adjusts a projection position on a projection surface of light projected from the light projection device 120 so as to curb fluctuation in the depression angle θ which occurs due to the movement of the vehicle M. For example, the display mode controller 152 generates control information for adjusting a depression angle θ by adjusting a projection position on a projection surface of light projected from the light projection device 120 by the display controller 172 in a case where the movement of the vehicle M which is obtained by the vehicle movement acquisition device 300 satisfies a predetermined condition, and outputs the generated control information to the display controller 172. Details of the function of the display mode controller 152 will be described later.

The driving controller 153 generates a control signal for moving the position of one or more lenses included in the optical mechanism 122 or the position of the display element 120B and a control signal for adjusting a rotation angle of the concave mirror 126 on the basis of the control information output by the display mode controller 152, and outputs the generated control signal to the optical system controller 170. The driving controller 153 generates a control signal so that a virtual image VI including an image at a position (a depression angle θ, a virtual image visible distance D) instructed by the display mode controller 152 is visually recognized on the basis of the lens position detected by the position sensor 162, the position of the display element 120B, and the rotation angle of the concave mirror 126 detected by the concave mirror angle sensor 164, and outputs the generated control signal to the optical system controller 170.

The storage 154 is realized by, for example, a read only memory (ROM), a random access memory (RAM), a hard disk drive (HDD), a flash memory, or the like. For example, setting information and other information are stored in the storage 154.

Figure 5:
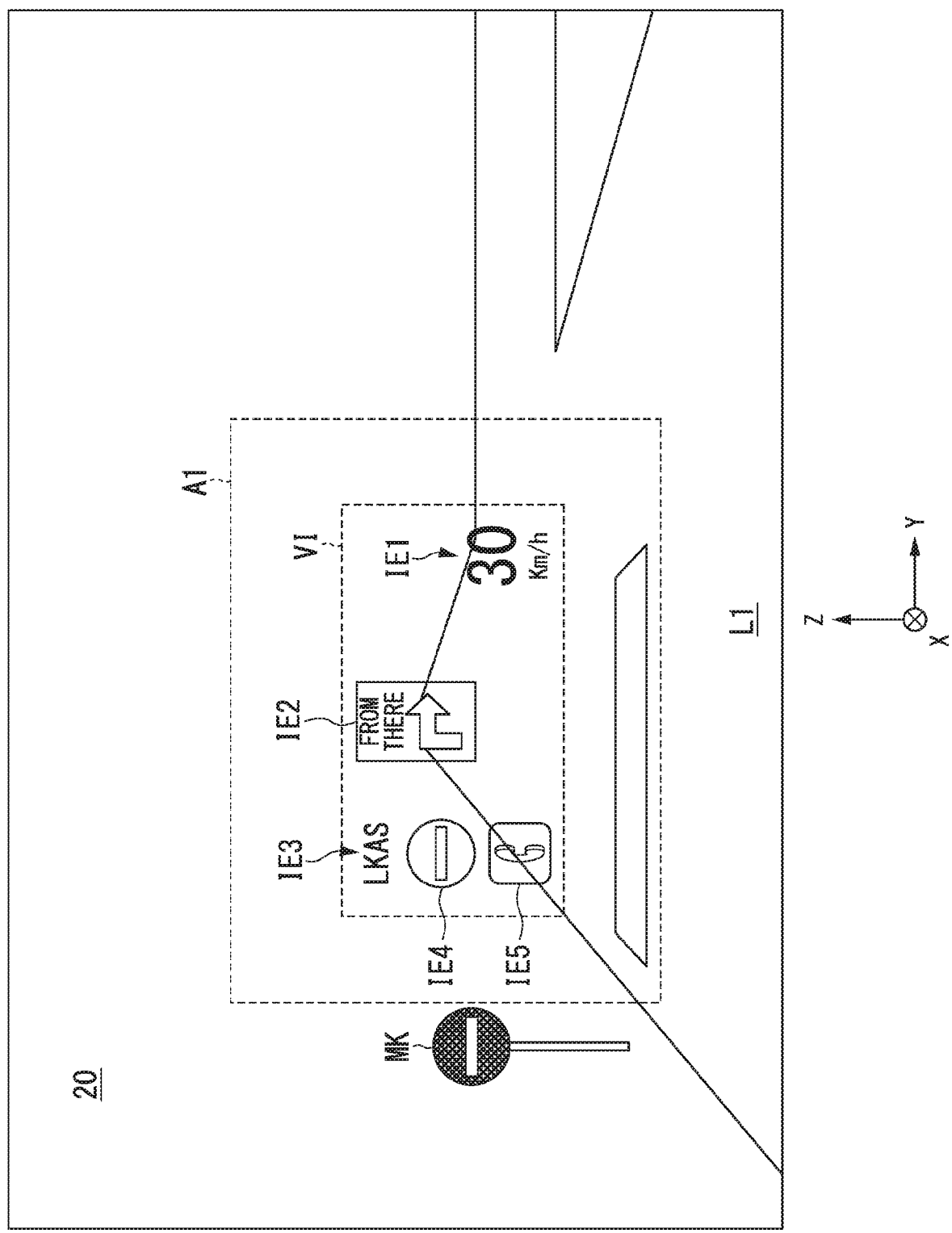
FIG. 5 is a diagram showing an example of a virtual image superimposed on a scene.

Next, an example of an image which is superimposed on a scene by the display device 100 and is visually recognizable by a driver as a virtual image VI will be described. FIG. 5 is a diagram showing an example of the virtual image VI which is superimposed on a scene. FIG. 5 shows an example of the virtual image VI which is superimposed on a scene (a scene in a real space in which a road L1, a sign MK, and the like are present) which is visually recognized through the front windshield 20 using the display device 100.

The virtual image VI includes one or more image elements IE. The image element IE includes, for example, the above-described first image or second image. In the example shown in FIG. 5, an image element IE1 indicating the speed of the vehicle M is an example of the first image. An image element IE2 indicates a direction instruction, an image element IE3 indicates the type of driving support function being executed, an image element IE4 indicates a sign, an image element IE5 indicates the incoming of a call in a telephone function installed in the vehicle M, and each of the elements is an example of the second image.

The display mode controller 152 outputs an image including an image element according to the state of the vehicle from the light projection device 120 after the display device 100 is started up (turned on). Specifically, referring to the example shown in FIG. 5, for example, in a case where the display device 100 is started up, the image generator 151 generates the image element IE1. In this case, the display mode controller 152 displays the generated image element IE1 on the lower right side of the virtual image VI when seen from the driver.

In a case where the vehicle M travels in the vicinity of an intersection, the image generator 151 generates an image including the image element IE2 corresponding to a display instruction for direction instruction information using the driving support function of the driving support control device 200. In this case, the display mode controller 152 displays the image element IE2 at the center of the virtual image VI. In a case where the driving support control device 200 determines that there is a possibility that the vehicle M will deviate from a lane on the road L1, the image generator 151 generates the image element IE3 corresponding to the letters of "LKAS". In this case, the display mode controller 152 displays the generated image element IE3 on the upper left side of the virtual image VI. In a case where a predetermined sign MK in front of the vehicle M is recognized by the environment sensor 166, the image generator 151 generates the image element IE4 corresponding to the sign. The predetermined sign MK is a sign of, such as temporary stop, maximum speed (speed limit), vehicle entry prohibited, passing prohibited, one-way traffic, or the like. In this case, the display mode controller 152 displays the generated image element IE4 at the center on the left side of the virtual image VI. In a case where an incoming call is received using the telephone function installed in the vehicle M, the image generator 151 generates the image element IE5 corresponding to an image indicating the incoming of a call. In this case, the display mode controller 152 displays the generated image element IE5 on the lower left side of the virtual image VI. In a case where a display condition of the image element IE is not satisfied, the display mode controller 152 terminates the display of the image element IE.

[Display Mode Controller]

Figure 6:
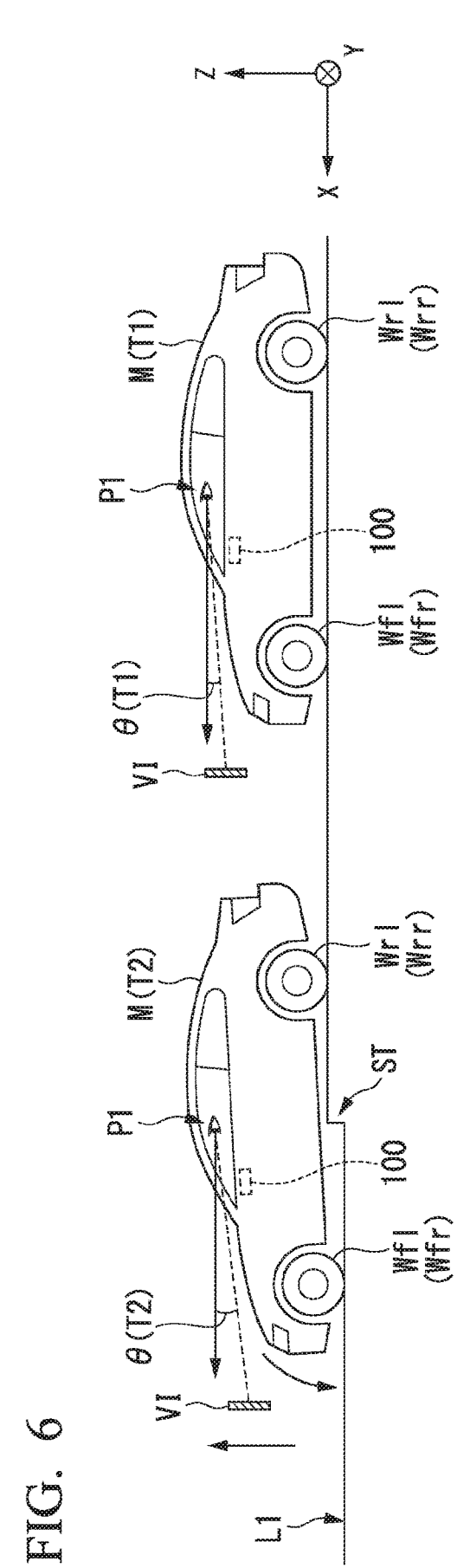
FIG. 6 is a diagram showing fluctuation in a depression angle due to movement of the vehicle M.

Next, details of the function of the display mode controller 152 will be described with reference to the accompanying drawings. The display mode controller 152 performs shake correction control for curbing fluctuation in a depression angle $\theta$ (more specifically, a shake of a virtual image VI) which occurs due to the movement of the vehicle M. FIG. 6 is a diagram showing fluctuation in a depression angle due to movement of the vehicle M. In FIG. 6, it is assumed that the vehicles M are traveling on the road L1 at equal speeds and there is a step ST on the road L1. The vehicle M at time T1 and the vehicle M at time T2 (T1<T2) are respectively denoted by M(T1) and M(T2), and depression angles $\theta$ thereof are respectively denoted by $\theta$(T1) and $\theta$(T2). Left and right front wheels of the vehicle M are respectively denoted by Wfl and Wfr, and left and right rear wheels thereof are respectively denoted by Wrl and Wrr.

In a case of the time T1, the vehicle M(T1) is traveling in a horizontal direction (in an X-axis direction).

In this case, it is assumed that the display device 100 displays a virtual image VI at a position which is separated from a sight line position P1 of the driver by a virtual image visible distance D and in which the depression angle $\theta$(T1) is formed, on the basis of setting information.

Here, in a case of the time T2, the left and right front wheels Wfl and Wfr of the vehicle M(T2) are at a lower stage of the step ST and the left and right rear wheels Wrl and Wrr are at an upper stage of the step, and thus the vehicle M(T2) is in an inclined state. In this case, the position of the virtual image VI is a position where the virtual image visible distance D is fixed and a depression angle $\theta$(T1) is the depression angle $\theta$(T2) obtained by adding a forward inclination angle (for example, an angle approximating to a pitch angle with respect to the vehicle M) of the vehicle M(T2) to the depression angle $\theta$(T1) by the display device 100 ($\theta$(T1)<$\theta$(T2)). In such a case, visibility may be lowered due to a downward shake of the virtual image VI viewed by the driver. Therefore, the position correction controller 152a of the display mode controller 152 performs control such that the depression angle $\theta$(T1) becomes constant in a case where the above-described movement of the vehicle M changes.

Figure 7:
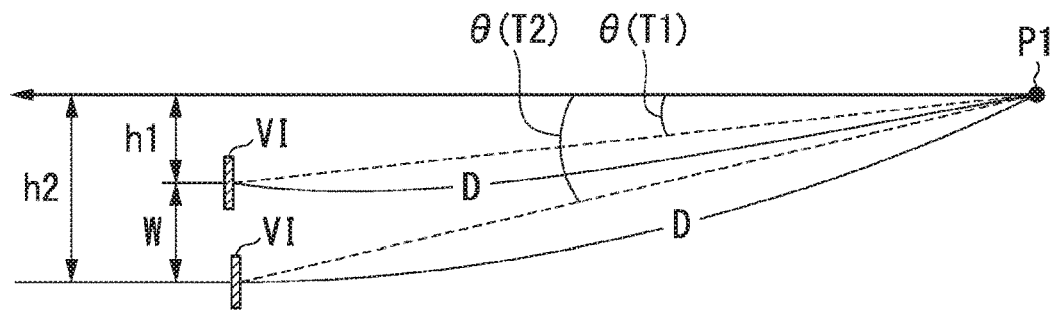
FIG. 7 is a diagram showing an example of calculation of fluctuation width in a vertical direction.

Specifically, the position correction controller 152a calculates a fluctuation width in a vertical direction in a case where the depression angle $\theta$(T1) transitions to the depression angle $\theta$(T2), and adjusts a depression angle so that the calculated fluctuation width approximates to zero (0). FIG. 7 is a diagram showing an example of calculation of a fluctuation width W in a vertical direction. The posture of the driver and the position of the driver's eyes vary depending on the postures of the vehicle M at the times T1 and T2, vibration due to passing over the step ST, or the like, but description will be given on the assumption that the variation is minimal as compared to that of the virtual image visible distance D and is thus not considered. Therefore, a fluctuation width W obtained from the following calculation is an approximate value of the actual fluctuation width.

In the example shown in FIG. 7, the position correction controller 152a calculates a distance (a height in a vertical direction) h1 from a horizontal surface at a depression angle $\theta$(T1) to the central position of a virtual image VI. The distance h1 is calculated according to, for example, h1=D sin $\theta$(T1). The position correction controller 152a calculates a distance h2 from a horizontal surface at a depression angle $\theta$(T2) to the central position of the virtual image VI. The distance h2 is calculated according to, for example, h2=D sin $\theta$(T2). For example, the depression angle $\theta$(T2) may be derived on the basis of a pitch angle detected by a pitch angle sensor included in the environment sensor 166 and the depression angle $\theta$1 determined by the display mode controller 152, or may be derived on the basis of values detected by height sensors provided in the front wheels Wfl and Wfr and the rear wheels Wrl and Wrr. In addition, the position correction controller 152a calculates a fluctuation width W using a difference (h2−h1) between the distance h2 and the distance h1.

Instead of the above-described calculation method, the position correction controller 152a may store a look-up table (LUT) in which a fluctuation width W is associated with a difference value between the depression angle θ(T1) and the depression angle θ(T2) or a difference value between the distance h2 and the distance h1 in the storage 154 in advance, and may acquire the associated fluctuation width W with reference to LUT from the difference value when the depression angle θ(T1), the depression angle θ(T2), and the distances h1 and h2 are acquired.

The position correction controller 152a performs correction control of a depression angle θ so that the acquired fluctuation width W approximates to zero (0), but a response is delayed due to the influence of a driving time of a motor, or the like in a case where correction is performed using the concave mirror actuator 182. For this reason, a time lag occurs between a timing when the movement of the vehicle M changes and a timing of the correction control of the depression angle θ, and thus there is a possibility that the virtual image VI will be shaken up and down in a direction opposite to the direction in which the vehicle M is shaken. Consequently, the position correction controller 152a performs correction control of the depression angle θ by adjusting a projection position on a projection surface of light projected from the light projection device 120 through display control of the display controller 172 with a high responsiveness.

Figure 8:
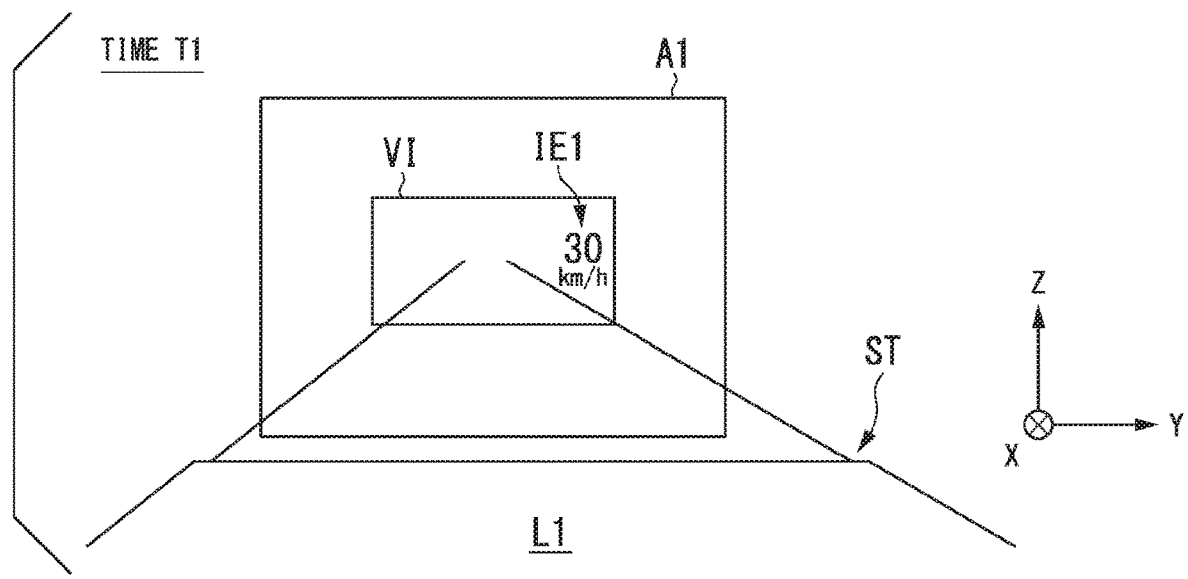
FIG. 8 is a diagram showing an example of a virtual image visually recognizable by a driver at time T1.

FIG. 8 is a diagram showing an example of a virtual image VI visually recognizable by the driver at time T1. In the example shown in FIG. 8, the position of the virtual image VI with respect to a displayable region A1 is schematically shown. This is the same as in the following similar drawings. At the time T1, the display mode controller 152 displays the virtual image VI including the image element IE1 indicating the speed of the vehicle M at the position of the depression angle θ(T1). Here, in a case where the movement of the vehicle M changes due to passing over the step ST on the road L1, the position correction controller 152a performs shake correction control of a depression angle θ in accordance with the change.

Figure 9:
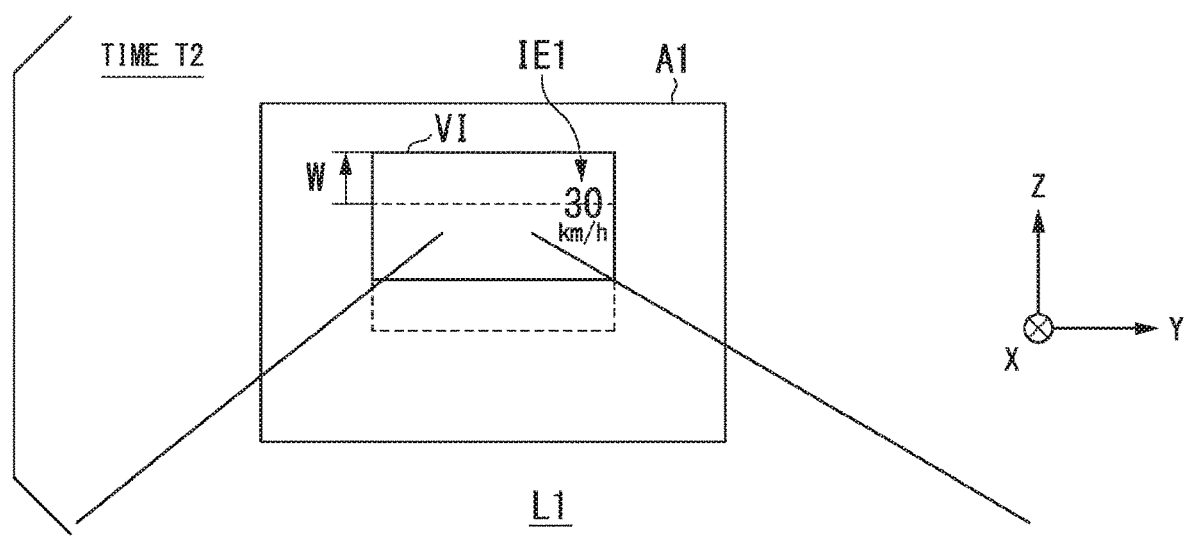
FIG. 9 is a diagram showing an example of a virtual image visually recognizable by a driver at time T2.

FIG. 9 is a diagram showing an example of a virtual image VI visually recognizable by the driver at time T2. The position correction controller 152a controls the display controller 172 so that the position of an image including the image element IE1 generated using a plurality of pixels of the display element 120B is changed so as to move the position of the virtual image VI upward by a fluctuation width W, and projects light at the changed position. The position correction controller 152a also performs downward shake correction, similar to the above-described upward shake correction. Thereby, the position correction controller 152a can curb fluctuation in a depression angle occurring due to fluctuation in the movement of the vehicle M. Since the position correction controller 152a mentioned above can be realized through image display control performed by the display element 120B, the position correction controller has a high responsiveness and can more rapidly adjust a reflection angle than when a reflection angle φ of the concave mirror 126 is adjusted by the concave mirror actuator 182. For this reason, it is possible to perform shake correction at a more appropriate timing in response to a change in the movement of the vehicle M.

The position correction controller 152a determines whether or not the fluctuation width W is equal to or greater than a threshold value, and may perform correction control of the above-described depression angle θ in a case where the fluctuation width W is equal to or greater than the threshold value.

[Processing Flow]

Figure 10:
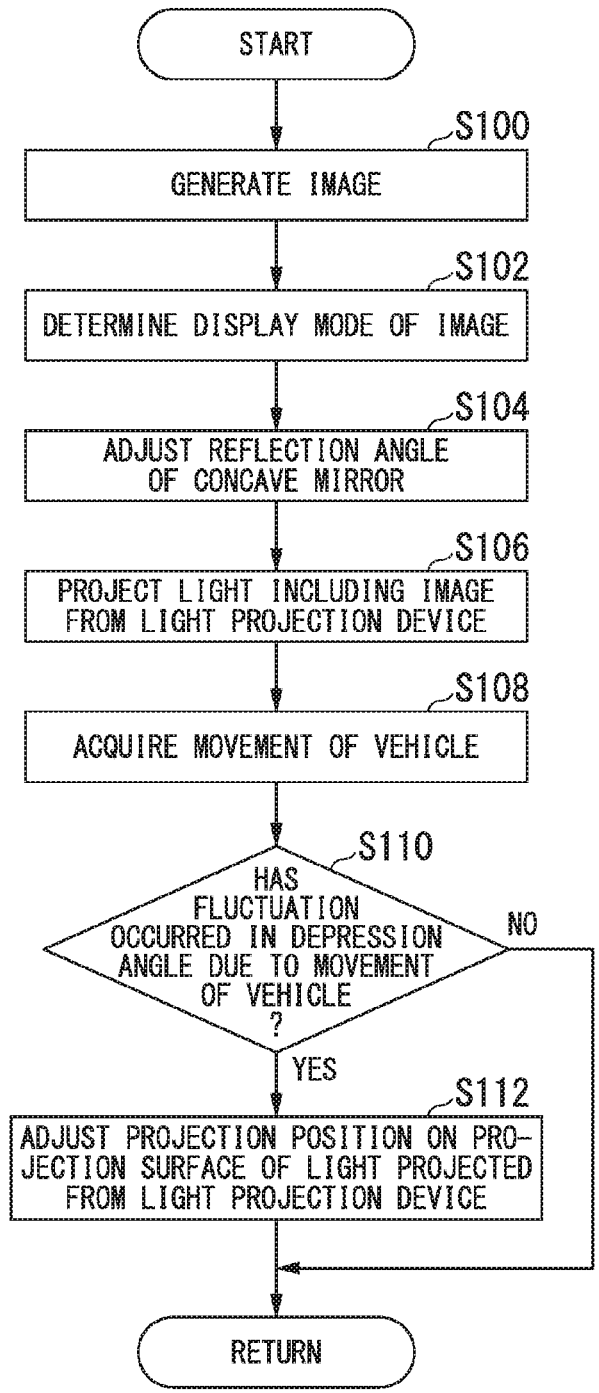
FIG. 10 is a flowchart showing a flow of processing executed by the display device of the first embodiment.

FIG. 10 is a flowchart showing a flow of processing executed by the display device 100 of the first embodiment. For example, the processing shown in FIG. 10 may be repeatedly executed at predetermined timings after the display device 100 is set to be in an on state by the operation switch 130.

First, the image generator 151 generates an image to be superimposed on a scene on the basis of setting information stored in the storage 154, and the like (step S100). Next, the display mode controller 152 determines a display mode of the generated image (step S102). Next, the driving controller 153 controls the concave mirror actuator 182 by the optical system controller 170 on the basis of the display mode determined by the display mode controller 152 to adjust a reflection angle φ of the concave mirror 126 so that the virtual image VI is visually recognizable at a depression angle shown in the display mode (step S104). Next, the display mode controller 152 projects light including an image generated on the basis of the display mode from the light projection device 120 by the display controller 172 (step S106).

Here, the display mode controller 152 acquires the movement of the vehicle M by the vehicle movement acquisition device 300 (step S108), and determines whether or not fluctuation has occurred in a depression angle due to the movement of the vehicle M (step S110). In a case where it is determined that fluctuation has occurred in a depression angle, the position correction controller 152a adjusts a projection position on a projection surface of the light projected from the light projection device 120 (step S112). Thereby, the processing of this flowchart is terminated. In the process of step S110, in a case where it is determined that fluctuation has not occurred in a depression angle due to the movement of the vehicle, the processing of this flowchart is terminated. In the process of step S110, it may be determined whether or not a change equal to or greater than a threshold value has occurred or whether or not there is a possibility that a change will occur in the future on the basis of a variation in a depression angle a few seconds ago.

According to the above-described first embodiment, the display device 100 includes a light projection device 120 which has a two-dimensional projection surface and projects light including an image, an optical mechanism 122 which is provided on a path of the light and is capable of adjusting a distance from a predetermined position to a position where light is formed as a virtual image, a concave mirror 126 which reflects light having passed through the optical mechanism 122 toward a reflector, a concave mirror actuator 182 which adjusts a reflection angle of the concave mirror 126, and a control device (the display control device 150, the optical system controller 170, the display controller 172) which controls the light projection device 120 and the concave mirror actuator 182. The control device can display an image which is more easily viewed by an observer by adjusting a projection position on the projection surface of the light projected from the light projection device 120 so as to curb fluctuation in a depression angle θ occurring due to the movement of the vehicle M.

According to the first embodiment, in a case where the driver gives an operation instruction for a depression angle θ in the vertical direction using the operation switch 130, the depression angle θ is adjusted by driving the concave mirror actuator 182. In a case where fluctuation in the depression angle θ occurring due to the movement of the vehicle M is curbed, the projection position on the projection surface of the light projected from the light projection device 120 is adjusted. Thereby, in a case where the vehicle is traveling on a rough road or the like, the shake of the virtual image VI can be curbed at a more appropriate timing, and thus the visibility of the virtual image VI of the observer can be improved.

Second Embodiment

Figure 11:
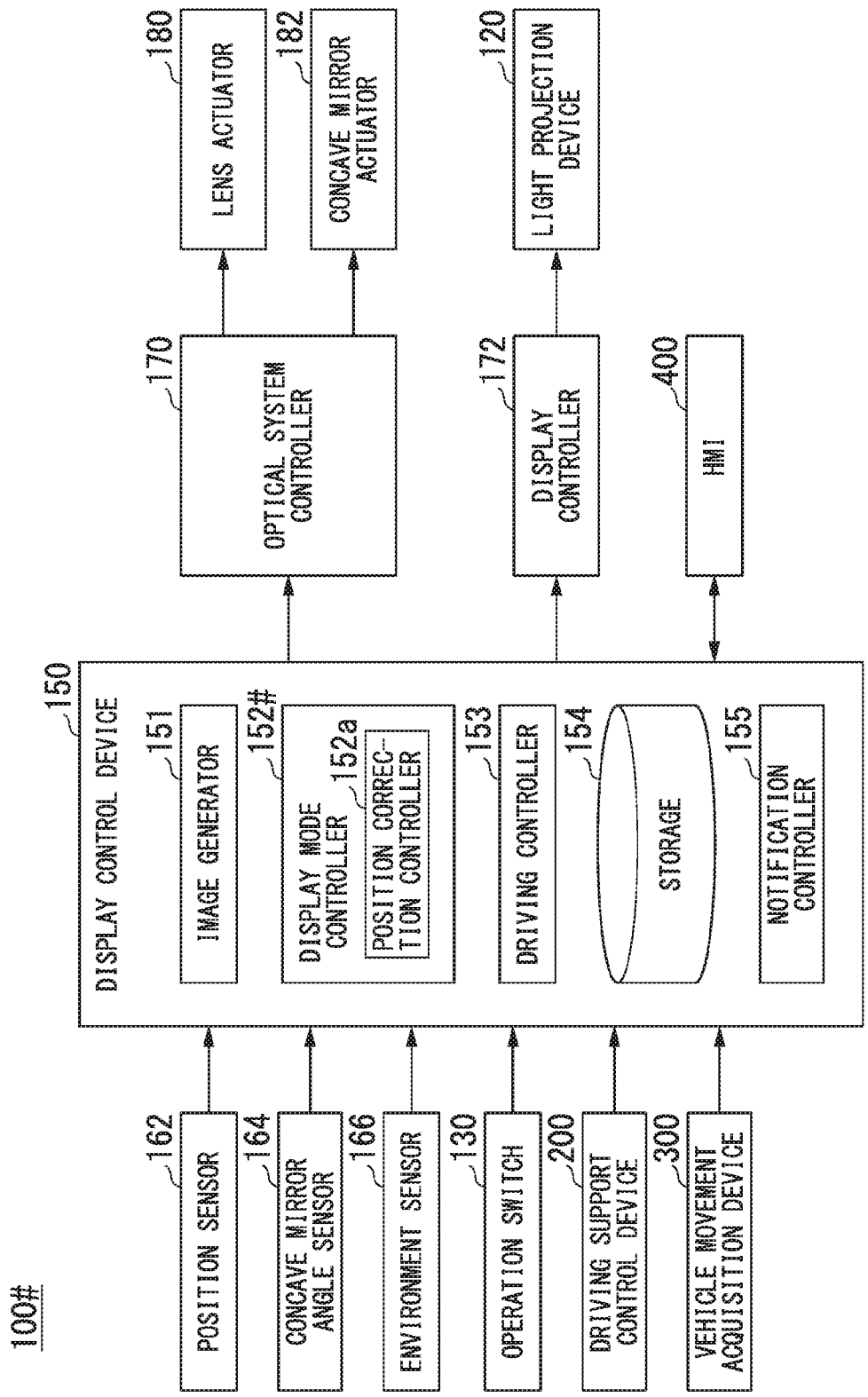
FIG. 11 is a diagram showing a configuration example of a display device centering on a display control device in a second embodiment.

Next, a second embodiment of a display device will be described. In the second embodiment, adjustment of a depression angle θ for driving a concave mirror actuator 182 by an optical system controller 170 and adjustment of the depression angle θ using a light projection device 120 by a display controller are combined with each other. Hereinafter, in the description of a display device 100# of the second embodiment, the same components as those of the display device 100 of the first embodiment are denoted by the same names and reference numerals, and specific description thereof will be omitted here. FIG. 11 is a diagram showing a configuration example of the display device 100# centering on a display control device 150 in the second embodiment. The display device 100# is different from the display device 100 in that the display control device 150 includes a display mode controller 152# instead of the display mode controller 152 and includes a notification controller 155. In the example shown in FIG. 11, a human machine interface (HMI) 400 is provided as compared with the first embodiment shown in FIG. 4. The HMI 400 is an example of a "notifier". Therefore, hereinafter, description will be mainly given focusing on the display mode controller 152#, the notification controller 155, and the HMI 400.

The HMI 400 presents various information to a driver of a vehicle M and receives the driver's input operation. The HMI 400 includes, for example, a first display 50-1, a second display 50-2, various other display devices, a speaker, a buzzer, a touch panel, switches, keys, and the like.

The display mode controller 152# has the same function as the display mode controller 152. In addition, the display mode controller 152# adjusts the position of a depression angle θ on the basis of an adjustment operation using an operation switch 130 and adjusts a projection position on a projection surface of light projected from the light projection device 120 by a display controller 172 in a case where the driving of a concave mirror 126 due to the driving of a concave mirror actuator 182 reaches a limit, thereby adjusting the depression angle θ. The driving of the concave mirror 126 reaching the limit means that, for example, a rotation angle of the concave mirror 126 around the Y-axis reaches a limit angle at which the concave mirror 126 cannot rotate any more in the same direction for structural reasons or the like. The driving of the concave mirror 126 reaching the limit means that, for example, at least one end of a virtual image VI reaches an upper limit or a lower limit of the virtual image VI in a case where the upper limit or the lower limit is set, in consideration of setting performed by the driver or the amount of shake correction control in the first embodiment.

Figure 12:
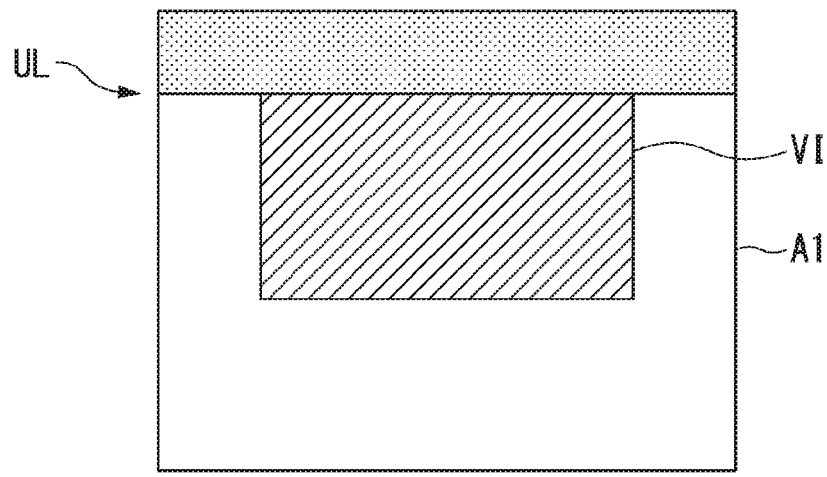
FIG. 12 is a diagram showing the position of a virtual image in a case where the driving of a concave mirror reaches a limit.

FIG. 12 is a diagram showing the position of a virtual image VI in a case where the driving of the concave mirror 126 has reached a limit. In the example shown in FIG. 12, it is assumed that an upper limit UL of display of the virtual image VI is set in a displayable region A1 by the driver. For example, the display mode controller 152# receives an instruction for moving the position of the virtual image VI upward using an adjustment switch 134 and moves the position of the virtual image VI upward in the displayable region A1 on the basis of the received instruction. Here, as shown in FIG. 12, in a case where an upper end of the virtual image VI reaches the upper limit UL and an upward adjustment operation using the adjustment switch 134 is continued, the display mode controller 152# executes movement further upward than the upper limit UL by the light projection device 120. The display mode controller 152# may inquire of the driver whether to adjust a depression angle θ in a case where the depression angle θ is adjusted by the light projection device 120 under the above-described conditions.

Figure 13:
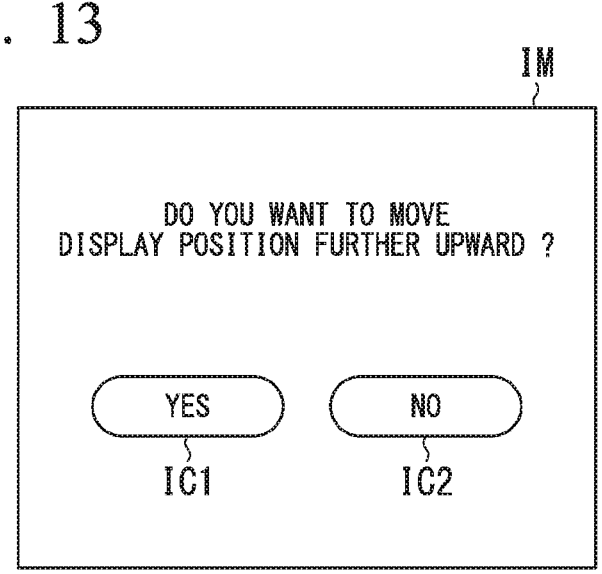
FIG. 13 is a diagram showing an example of an inquiry screen displayed on an HMI.

FIG. 13 is a diagram showing an example of an inquiry screen displayed on the HMI 400. In a case where the upper end of the virtual image VI reaches the upper limit UL due to the driving of the concave mirror actuator 182, the notification controller 155 generates an image IM as shown in FIG. 13 and displays the generated image IM on the second display 50-2.

The image IM shown in FIG. 13 includes inquiry information for inquiring whether to move the display of the virtual image VI further upward, an icon IC1 for permitting upward movement, and an icon IC2 for rejecting upward movement.

Figure 14:
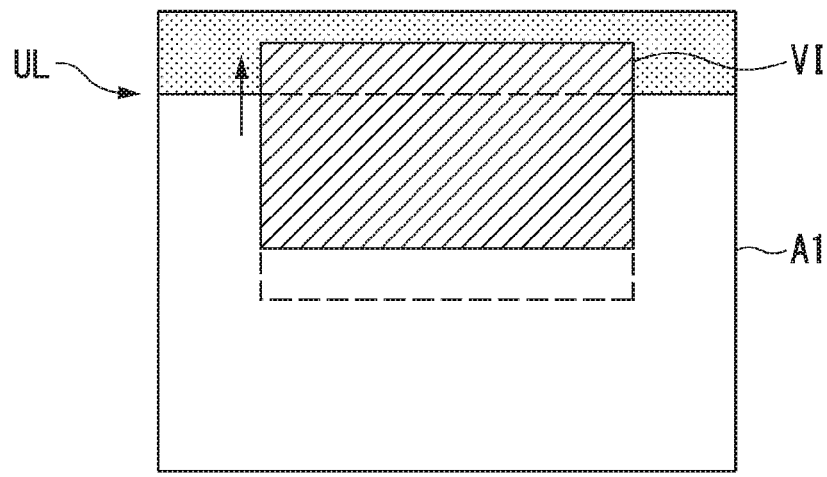
FIG. 14 is a diagram showing a virtual image moved upward from an upper limit under the control of a light projection device.

Here, in a case where the icon IC1 is selected by the driver, the display mode controller 152# further moves the position of the virtual image VI upward under the control of the light projection device 120. FIG. 14 is a diagram showing the virtual image VI moved further upward than the upper limit UL under the control of the light projection device 120. In a case where the icon IC1 is selected by the driver, the display mode controller 152# moves the position of the virtual image VI further upward than the upper limit UL as shown in FIG. 14. In the second embodiment, control for moving the virtual image VI upward may be performed by the light projection device 120 without making an inquiry for the driver. In a case where the icon IC2 is selected by the driver, control for moving the virtual image VI upward is not performed by the light projection device 120. In this manner, according to the second embodiment, it is possible to enlarge a display position of the virtual image VI. The inquiry as shown in FIG. 13 is performed, and thus it is possible to display the virtual image VI at a position desired to be visually recognized by the driver.

In the second embodiment, first, the display mode controller 152# may adjust a depression angle θ by the light projection device 120 and then adjust a rotation angle of a concave mirror around the Y-axis due to the driving of a concave mirror actuator to adjust the depression angle θ. Thereby, it is possible to accelerate a timing of initial movement of the virtual image VI.

Figure 15:
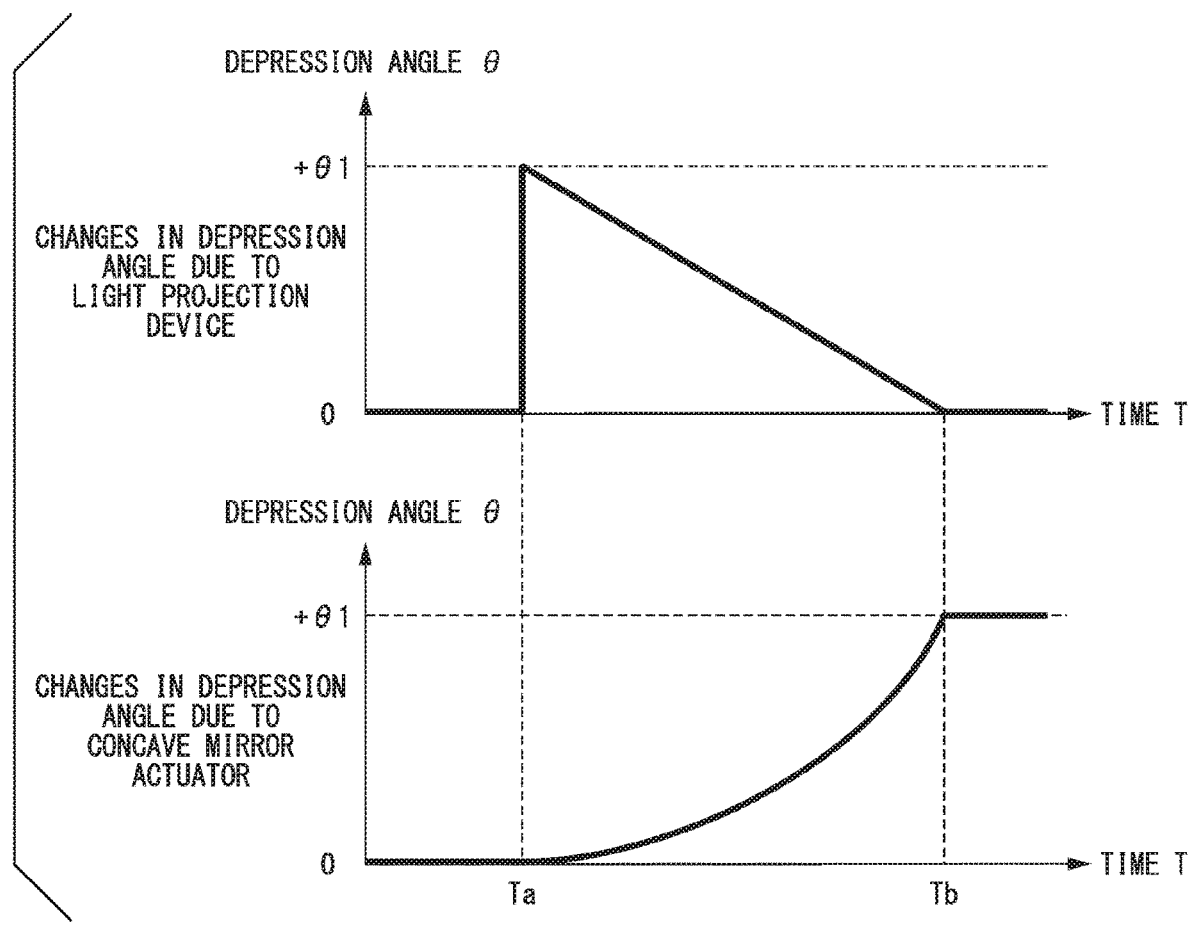
FIG. 15 is a diagram showing changes in a depression angle due to the light projection device and changes in a depression angle due to a concave mirror actuator.

The display mode controller 152# may adjust a depression angle θ by the light projection device 120 and then adjust a depression angle θ by the concave mirror actuator 182. FIG. 15 is a diagram showing changes in a depression angle due to the light projection device 120 and changes in a depression angle due to the concave mirror actuator 182. In FIG. 15, a horizontal axis represents time T, and a vertical axis represents a depression angle θ. For example, when the display mode controller 152# receives an instruction for changing the position of a depression angle at a timing of time Ta, the display controller 172 controls the light projection device 120 that a depression angle θ is moved from the present angle by +θ1. The display mode controller 152# performs control so that the position of a depression angle is moved by +θ1 by the concave mirror actuator 182. Here, the display mode controller 152# causes the display controller 172 to adjust a depression angle due to the light projection device 120 in accordance with changes in the depression angle θ by the concave mirror 126 on the basis of an angle of the concave mirror 126 which is detected by the concave mirror angle sensor 164 to perform control for maintaining a depression angle (+θ1) through depression angle control of each of the light projection device 120 and the concave mirror actuator 182. The depression angle control by the light projection device 120 is terminated at time Tb when the depression angle θ was moved by +θ1 from an angle before change due to the driving of the concave mirror actuator 182. In this manner, a depression angle is adjusted by the light projection device 120 for the purpose other than the purpose of curbing fluctuation occurring due to the movement of the vehicle M, and thus it is possible to display the virtual image VI so that the driver can easily view the virtual image.

[Processing Flow]

Figure 16:
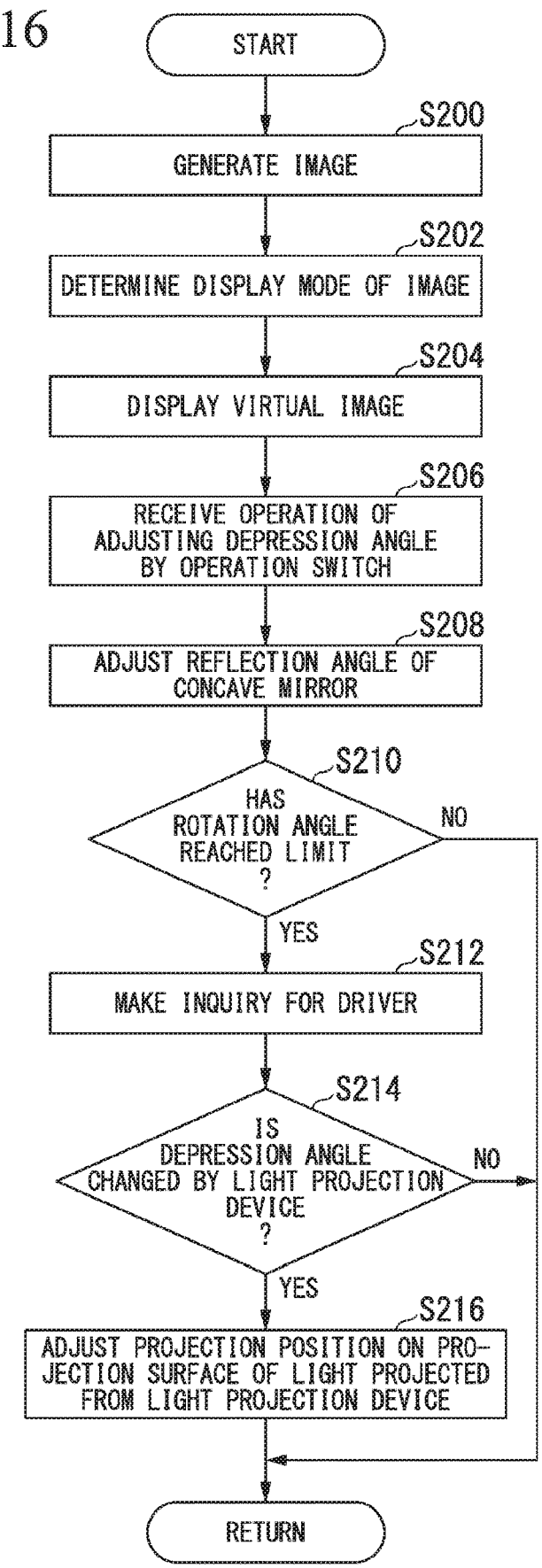
FIG. 16 is a flowchart showing a flow of processing executed by the display device of the second embodiment.

FIG. 16 is a flowchart showing a flow of processing executed by the display device 100# of the second embodiment. For example, the processing shown in FIG. 16 is repeatedly executed at a predetermined timing after the display device 100# is set to be in an on state by the operation switch 130.

First, the image generator 151 generates an image to be superimposed on a scene on the basis of setting information stored in a storage 154 (step S200). Next, the display mode controller 152# determines a display mode of the generated image (step S202), and displays the virtual image VI within the displayable region A1 on the basis of the determined display mode (step S204).

Next, the display mode controller 152# receives an operation of adjusting a depression angle due to the operation switch 130 (step S206), drives the concave mirror actuator 182 on the basis of details of the received adjustment operation, rotates the concave mirror 126 around the Y-axis to adjust a reflection angle φ, and changes a depression angle θ (step S208). Next, the display mode controller 152# determines whether or not a rotation angle of the concave mirror 126 around the Y-axis has reached a limit (step S210). In a case where it is determined that the rotation angle has reached the limit, the notification controller 155 inquires whether to further change a depression angle using the HMI 400 (step S212). Next, the display mode controller 152# determines whether to changes a depression angle due to the light projection device 120 on the basis of the result of the inquire (step S214). In a case where it is determined that a depression angle is changed, the display mode controller 152# adjusts a projection position on a projection surface of light projected from the light projection device 120 by the display controller 172 to change a depression angle (step S216). Thereby, the processing of this flowchart is terminated. In a case where it is determined in the process of step S210 that the rotation angle has not reached the limit or In a case where it is determined in the process of step S214 that a depression angle is not changed by the light projection device 120, the processing of this flowchart is terminated.

According to the above-described second embodiment, it is possible to rapidly move the virtual image VI in a wide range by combining the adjustment of a depression angle θ for driving the concave mirror actuator 182 and the adjustment of a depression angle θ using the light projection device 120 by the display controller, in addition to exhibiting the same effects as in the first embodiment. Therefore, it is possible to make the virtual image VI visually recognized at a more appropriate position in accordance with the movement of the vehicle M.

The above-described first and second embodiments may be combined with some or all of other embodiments. The display devices 100 and 100# may project an image onto a light transmissive reflection member such as a combiner provided between the position of the driver and the front windshield 20, instead of directly projecting an image onto the front windshield 20.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display device comprising:
a light projection device which has a projection surface and projects light including an image, wherein the projection surface is a two-dimensional projection surface;
an optical mechanism which is provided on a path of the light and is capable of adjusting a distance from a predetermined position to a position where the light is formed as a virtual image;
a concave mirror which reflects light having passed through the optical mechanism toward a reflector;
a concave mirror actuator which adjusts a reflection angle of the concave mirror;
a control device which controls the light projection device and the concave mirror actuator; and
an operator which receives an adjustment operation for the angle formed by the horizontal surface and the segment from an occupant of the vehicle,
wherein the control device adjusts a projection position on the projection surface of the light projected from the light projection device having an angle formed by a horizontal surface passing through a predetermined position on an image formed by the concave mirror and a segment from the predetermined position to a position where the light is formed as a virtual image so as to curb fluctuation occurring due to movement of a vehicle,
wherein the control device adjusts the angle by driving the concave mirror actuator on the basis of the adjustment operation in a case where the adjustment operation for the angle is received by the operator, and adjusts the projection position on the projection surface of the light projected from the light projection device in a case where fluctuation in the angle occurring due to movement of the vehicle is curbed,
wherein the control device adjusts the projection position on the projection surface of the light projected from the light projection device in a case where driving of the concave mirror due to the driving of the concave mirror actuator based on the received adjustment operation has reached a limit, thereby adjusting the angle formed by the horizontal surface and the segment.

2. The display device according to claim 1, further comprising:
a notification controller which notifies the occupant of the vehicle of information using a notifier,
wherein the notification controller inquires of the occupant using the notifier whether to adjust the projection position on the projection surface of the light projected from the light projection device in a case where the driving of the concave mirror due to the driving of the concave mirror actuator has reached a limit.

3. The display device according to claim 1, wherein the control device adjusts the projection position on the projection surface of the light projected from the light projection device and then adjusts the reflection angle of the concave mirror due to the driving of the concave mirror actuator, thereby adjusting the angle formed by the horizontal surface and the segment.

4. A display control method comprising:
causing a display device to adjust a projection position on a projection surface of light projected from a light projection device having an angle formed by a horizontal surface passing through a predetermined position on an image formed by a concave mirror and a segment from the predetermined position to a position where the light is formed as a virtual image so as to curb fluctuation occurring due to movement of a vehicle,
adjusting the angle by driving the concave mirror actuator on the basis of the adjustment operation in a case where the adjustment operation for the angle is received by an operator, and adjusts the projection position on the projection surface of the light projected from the light projection device in a case where fluctuation in the angle occurring due to movement of the vehicle is curbed,
adjusting the projection position on the projection surface of the light projected from the light projection device in a case where driving of the concave mirror due to the driving of the concave mirror actuator based on the received adjustment operation has reached a limit, thereby adjusting the angle formed by the horizontal surface and the segment,
the display device including the light projection device which has the projection surface and projects light including an image, wherein the projection surface is a two-dimensional projection surface,
an optical mechanism which is provided on a path of the light and is capable of adjusting a distance from the predetermined position to the position where the light is formed as a virtual image,
the concave mirror which reflects light having passed through the optical mechanism toward a reflector,
a concave mirror actuator which adjusts a reflection angle of the concave mirror,
a control device which controls the light projection device and the concave mirror actuator, and
an operator which receives an adjustment operation for the angle formed by the horizontal surface and the segment from an occupant of the vehicle.

5. A computer readable non-transitory storage medium storing a program for causing a display device to adjust a projection position on a projection surface of light projected from a light projection device having an angle formed by a horizontal surface passing through a predetermined position on an image formed by a concave mirror and a segment from the predetermined position to a position where the light is formed as a virtual image so as to curb fluctuation occurring due to movement of a vehicle,
adjusting the angle by driving the concave mirror actuator on the basis of the adjustment operation in a case where the adjustment operation for the angle is received by an operator, and adjusts the projection position on the projection surface of the light projected from the light projection device in a case where fluctuation in the angle occurring due to movement of the vehicle is curbed,
adjusting the projection position on the projection surface of the light projected from the light projection device in a case where driving of the concave mirror due to the driving of the concave mirror actuator based on the received adjustment operation has reached a limit, thereby adjusting the angle formed by the horizontal surface and the segment,
the display device including the light projection device which has the projection surface and projects light including an image, wherein the projection surface is a two-dimensional projection surface,
an optical mechanism which is provided on a path of the light and is capable of adjusting a distance from the predetermined position to the position where the light is formed as a virtual image,
the concave mirror which reflects light having passed through the optical mechanism toward a reflector,
a concave mirror actuator which adjusts a reflection angle of the concave mirror, and a control device which controls the light projection device and the concave mirror actuator, and
an operator which receives an adjustment operation for the angle formed by the horizontal surface and the segment from an occupant of the vehicle.

* * * * *